(12) United States Patent
Kelnhofer et al.

(10) Patent No.: US 9,689,597 B2
(45) Date of Patent: Jun. 27, 2017

(54) AIR-CONDITIONING SYSTEM FOR AN AIRCRAFT, AND METHOD FOR AN AIRCRAFT

(71) Applicant: Airbus Operations GmbH, Hamburg (DE)

(72) Inventors: Jürgen Kelnhofer, Hamburg (DE); Dariusz Krakowski, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 301 days.

(21) Appl. No.: 14/573,059

(22) Filed: Dec. 17, 2014

(65) Prior Publication Data

US 2015/0168039 A1    Jun. 18, 2015

(30) Foreign Application Priority Data

Dec. 17, 2013    (EP) .................................. 13 197 860

(51) Int. Cl.
*F25B 49/02*    (2006.01)
*B64D 13/06*    (2006.01)

(52) U.S. Cl.
CPC .............. *F25B 49/02* (2013.01); *B64D 13/06* (2013.01); *B64D 2013/0655* (2013.01); *Y02T 50/56* (2013.01)

(58) Field of Classification Search
CPC . B62D 13/06; B62D 2013/0655; F25B 49/02; Y02T 50/56

(Continued)

(56) References Cited

U.S. PATENT DOCUMENTS 7,775,447 B2 *   8/2010   Scherer .................. B64D 13/00
                                                      165/203
7,802,732 B2 *   9/2010   Scherer .................. B64D 13/00
                                                      165/205

(Continued)

FOREIGN PATENT DOCUMENTS

DE    102008053320 A1    5/2010
EP       0616941 A1      9/1994

(Continued)

OTHER PUBLICATIONS

European Patent Office, European Search Report for European Patent Application No. 13197860.3 mailed Apr. 24, 2014.

*Primary Examiner* — Marc Norman
(74) *Attorney, Agent, or Firm* — Lorenz & Kopf, LLP

(57) ABSTRACT

An aircraft air conditioning system comprises a plurality of temperature zones and at least one door. Comprises an air-conditioning unit configured to condition and provide air to at least one of the plurality of temperature zones, temperature zone sensors each associated with a temperature zone for measuring the temperature therein, and a control unit. The control unit receives information representing the closing state of a cabin door, and is coupled to the temperature zone sensors and configured to control the temperature of the conditioned air provided to at least one of the plurality of temperature zones in two operation modes. In a first mode, when doors are closed, the temperature control depends on the measured temperatures in the temperature zones. In the second mode, it depends on a set-temperature, independent of the measured temperature in a temperature zone affected by an open door.

14 Claims, 3 Drawing Sheets

(58) Field of Classification Search
USPC .................................. 236/1 B; 62/DIG. 5
See application file for complete search history.

(56) References Cited

U.S. PATENT DOCUMENTS

2009/0305622 A1   12/2009   Schiek
2012/0298348 A1   11/2012   Mise et al.

FOREIGN PATENT DOCUMENTS

EP   2363653 A2   9/2011
EP   2647571 A1   10/2013
WO   2005063578 A1   7/2005

* cited by examiner

AIR-CONDITIONING SYSTEM FOR AN AIRCRAFT, AND METHOD FOR AN AIRCRAFT

CROSS-REFERENCE TO RELATED APPLICATIONS

This application claims the priority to European Patent Application No. 13 197 860.3, filed Dec. 17, 2013, the disclosure of which application is incorporated herein by reference in its entirety.

TECHNICAL FIELD

The embodiments described herein relate generally to an air-conditioning system and method for an aircraft.

BACKGROUND

Commercial aircraft often comprise air-conditioning systems that are based on an air cycle process that provides sufficient cooling power, ventilation air flow, and pressurization. Such an air-conditioning system typically comprises a compact air-conditioning unit, which is also known as an "air conditioning pack", is usually arranged, for example, in a wing root or belly fairing of the aircraft, and is supplied with compressed process air. The process air may be generated by a compressor or may be bled from a compressor stage of an engine or an auxiliary power unit (APU) of the aircraft. During flight operation of the aircraft, engine bleed air is used, usually during ground operation of the aircraft, primarily compressed process air from an auxiliary power unit of the aircraft or from a ground unit is used.

In the air-conditioning unit, the process air flows through at least one heat exchanger as well as through various compression and expansion units and is cooled and expanded. Cooled process air exiting the air-conditioning unit is finally supplied to a mixing chamber where it is mixed with recirculation air recirculated from an aircraft region to be air-conditioned. For example, DE 10 2008 053 320 A1 shows such an air-conditioning system.

Often, an aircraft cabin to be conditioned is separated into a number of different temperature (control) zones. The number of temperature zones depends on the size of the aircraft and a desired cabin layout. Every temperature zone usually has a dedicated zone temperature sensor, which measures the temperature in the respective temperature zone. A control unit for controlling the air conditioning system receives temperature signals from all temperature sensors in the aircraft and controls the air-conditioning system such that the temperatures in the temperature zones meet the desired temperatures.

Typically, the temperature zone with the highest cooling demand determines the reference temperature for the air supplied to the cabin from a centralized mixer unit, which is fed by the conditioned process air of the air-conditioning system and the recirculated air. In order to prevent an excessive cooling for all other temperature zones with less cooling demand, individual air supply to these temperature zones will be heated by electrical heaters or through a controlled supply of hot trim air into the individual supply ducts.

SUMMARY

When an aircraft is operated on the ground with an air-conditioning system switched on, passenger doors may be opened. This may allow an air exchange between the cabin and the area surrounding of the aircraft through the access opening. When temperatures between the cabin and the surroundings of the aircraft differ, the temperature control function of the air conditioning system will be affected. This means the cabin gets too cold when the ambient temperature is lower, or the cabin gets too warm when the ambient temperature is higher. As the air-conditioning system is commonly operated in a fully automatic mode, it will try to compensate for this sensed temperature difference by additional cooling or heating. As explained above, this may affect the operation of the air conditioning system as a whole, since the temperature zone with the highest cooling or heating demand determines the temperature of the air supplies to the cabin. This may decrease the efficiency of the air conditioning system and consequently of the whole aircraft during ground operation.

It may thus be considered an object to provide an air-conditioning system that allows a particularly energy-efficient operation of the air-conditioning system especially during ground operation with at least one open passenger door.

An air-conditioning system for conditioning a cabin of an aircraft, the cabin having a plurality of temperature zones and at least one door, is proposed. The air-conditioning system comprises an air-conditioning unit, which is configured for conditioning air and providing the conditioned air to at least one of the plurality of temperature zones, a plurality of zone temperature sensors each of which is associated with a temperature zone, and at east one control unit. The at least one control unit is configured to receive information representing the closing state of the at least one door of the cabin, wherein the at least one control unit is coupled with the plurality of zone temperature sensors and is adapted for selectively controlling the temperature of the conditioned air provided to at least one of the plurality of temperature zones in a first operation mode, when the at least one door is closed and in a second operation mode when at least one of the at least one door is open, wherein in the first operation mode the temperature of the conditioned air provided to at least one of the plurality of temperature zones is controlled depending on the measured temperatures by at least one of the plurality of temperature zones and, in the second operation mode, the temperature of the conditioned air provided to at least that temperature zone closest to an open one of the at least one door is controlled depending on at least one set-temperature.

The air-conditioning unit may be based on an air cycle process and is adapted for compressing, cooling, and expanding process air supplied from a compressor stage of en engine or an auxiliary power unit (APU), through an arrangement of at least one compressor, at least one heat exchanger, and at least one expansion turbine. In this manner, the air-conditioning unit provides a large volume flow of conditioned process air in a very reliable and technical mature manner. The at least one heat exchanger may be positioned in a ram air channel and may comprise a pre-cooler and a main heat exchanger.

The air-conditioning unit may supply conditioned air to an air supply unit, through which it may reach the cabin and the temperature zones created therein, or to the cabin directly. According to an embodiment, the temperature of the conditioned air provided to the cabin is controlled. Conditioned air provided to the cabin may be a mixture of used air from the cabin and conditioned air from the air conditioning unit.

An air supply unit may be based on a plurality of different devices. In particular, the supply unit may be a mixing chamber that comprises a number of ports for receiving air and a number of ports for providing air to one or more spaces to be air conditioned. For example, this supply unit has a number of recirculation ports that are connected to recirculation fans distributed along the cabin for drawing air from the cabin. Furthermore, the supply unit comprises at least one port for an air-conditioning unit that supplies conditioned fresh air into the mixing chamber. For supplying air from the supply unit to a chamber to be air conditioned, at least one supply port is present that is connected to at least one air supply duct. In an exemplary embodiment, a plurality of zone air ducts may be connected to the air supply unit. This may be accomplished via a plurality of supply ports or by connecting a main air duct to the air supply unit and connecting zone air ducts to the main air duct in the form of a plurality of branches. The temperature of the conditioned air provided to the temperature zones may be measured by a temperature sensor situated inside the air supply unit, e.g. a mixing chamber, but may also be provided in an air duct downstream thereof. Basically, the supply unit may supply air with the same temperature to each zone air duct, while the addition of warmer/hotter trim air or the integration of a heating element in certain zone air ducts leads to the individual temperature in the respective zone. If cooling of the cabin is necessary, the temperature zone with the highest cooling demand determines the cooling power of the air conditioning unit, and all other temperature zones adjust the temperature of their individual air supply by means of reheating the air supply flow.

An aircraft cabin requires at least one door that gives access to the passenger cabin for the purpose of boarding, planning, taking on food, maintenance, and/or for cleaning the aircraft cabin. Hence, the aircraft door may be open for a period of time.

As the aircraft cabin is divided into a plurality of temperature zones, an aircraft door may be present in at least one temperature zone. Since the ambient temperature man not match a desired cabin temperature, an open cabin door may lead to disturbing the control of the air-conditioning process.

Based on the fact that the total airflow entering the cabin may be constant, the temperature of the air provided to the cabin is directly responsible for the delivered, i.e. effective, cooling power to the cabin. It goes without saying that an open door may lead to ambient air entering the cabin, such that the temperature in the respective temperature zone may rise above the desired temperature zone temperature or fall below the desired temperature. By interpreting the temperature signal from a temperature sensor in the affected temperature zone as usual, the required temperature of the air entering the cabin may not be able to overcome this distortion unless the cooling or heating power from the air conditioning system is clearly increased.

A control unit of the air-conditioning system according an embodiment receiving information about the opening status of at least one aircraft door and adjust the air conditioning process in consideration of the open aircraft door in two different operation modes. In the first operation mode, a usual temperature control during flight may be accomplished. In the second operation mode, another control scheme may be selected, in which a temperature measured in a particular affected temperature zone with an open door may simply be processed or interpreted differently or completely neglected, such that the air conditioning system does not adjust the delivered cooling or heating power based on the disturbance due to the open door at least in this particular temperature zone. In accordance with an embodiment, the air conditioning process may basically be unaffected by the opening status of at least one aircraft door and the temperature control in at least the affected temperature zone disregarded. Hence, an embodiment comprises selectively switching from a more common, fully automatic temperature control in a first operational mode to a slightly degraded automatic temperature control once a door is opened in a second operational mode. In this regard, the set-temperature in the second operational mode is to be understood as a control variable, a state variable or a target variable, in a control loop responsible for the delivered cooling or heating power of the air conditioning unit.

As the delivered power of the air-conditioning system only slightly depends on the opening status of the at least one door, the air-conditioning system comprises a clearly increased efficiency compared to other known air-conditioning systems. The operation of the air-conditioning system on ground leads to a reduced consumption of bleed air especially from the auxiliary power unit, thereby leading to prolonged life. Also, fuel consumption, especially on ground, is clearly decreased.

In further embodiments, the control unit comprises a cabin zone layout device that is adapted for storing information about a cabin zone layout including the position of a plurality of temperature zones in relation to the at least one aircraft door, wherein the zone layout device may be coupled to the control unit and configured to identify the temperature zone closest to an open one of the at least one door. The zone layout device is thereby configured to correlate the position of the at least one aircraft door and the temperature zones in a cabin and to provide information about the affected temperature zone(s). Such a cabin zone layout device may comprise information about the spatial positions of different temperature zones inside the aircraft cabin as well as spatial positions of the at least one aircraft door in relation to the temperature zones. Hence, by requesting or querying information about affected temperature zones with regard to the opening status of the at least one aircraft door, the cabin layout device may deliver information about the affected temperature zone. Preferably, the temperature layout device is also configured to deliver information on the presence of adjacent temperature zones as well as about the presence of temperature zones with a larger distance to the respective aircraft door, i.e. the affected temperature zone. The control unit is thereby capable of finding out which temperature zone in the cabin may be affected by an open aircraft door and may provide information about which temperature zone is clearly unaffected by the open aircraft door, e.g. a temperature zone with a maximum distance to the open aircraft door(s). Also, the control unit may request information about an adjacent temperature zone, such that the measured temperature of the affected temperature zone may be substituted by the measured temperature of an adjacent zone or a zone that is further away than the adjacent temperature zone.

In a preferred embodiment, the control is configured for creating the set-temperature depending on at least one measured temperature in at least one temperature zone that is not closest to an open one of the at least one door. This may completely eliminate influence of an opening status of the at least one aircraft door on the control of the air conditioning system.

In a further advantageous embodiment, the control unit is configured to receive information about an ambient temperature, wherein the control unit is configured to determine the set-temperature based on a difference between a desired temperature in that temperature zone closest to an open one of the at least one door and the ambient temperature. For example, on a hot day, air that enters the affected temperature zone may have a clearly higher temperature than the desired temperature in this temperature zone, which could cause the passengers that have already boarded to feel uncomfortable. Also, if it is very cold outside, the temperature difference with the desired temperature in the affected temperature zone may be even higher. Hence, depending on this difference, the required cooling or heating power may be adjusted for the affected temperature zone, such that particularly during boarding, the passengers in the vicinity of the open door do not feel uncomfortable. For example, the substituted temperature may equal the measured temperature of an adjacent temperature zone, to which a certain percentage of the difference between desired temperature and the ambient temperature is added, such as 5%-25% or a percentage that depends on the difference to a comfort temperature range. Also, a fixed value, e.g. 2° C., may be added to or subtracted from the measured temperature of an adjacent temperature zone, depending on whether the ambient temperature is lower or higher than the desired temperature in the affected temperature zone.

However, the control unit may also be configured to set the set-temperature to the measured temperature of a temperature zone adjacent to that temperature zone closest to an open one of said at least one door. The air conditioning system thereby is completely unaffected by the open door, but a temperature control for influencing the delivered thermal power of the air conditioning unit is still accomplished through feeding back a temperature that is similar to a temperature measured in the affected temperature zone if the door was closed.

Also, the control unit is configured to set the set-temperature to a predetermined fixed temperature. However, depending on the ambient temperature, the control unit may comprise a small number of different substitution temperatures that may be selected depending on the ambient temperature, e.g. for cold weather or hot weather. This may be selected through a switch or an input on a cabin attendant panel (CAP) and may be in a range of, but not limited to, a temperature of 20° to 23°.

Furthermore, in the second operation mode, the temperature of the conditioned air provided to at least that temperature zone closest to an open one of the at least one door may be controlled independent of a temperature measured by any of the temperature zone sensors.

In a still further embodiment, the control unit is configured to control the temperature of the conditioned air delivered by the air-conditioning unit in the second mode of operation to assume a predetermined temperature. This leads to delivering air with a constant temperature to the cabin, independently from any measured temperature.

An embodiment described herein further relates to a method for conditioning a cabin of an aircraft, the cabin having a plurality of temperature zones and at least one door extending into at least one of the temperature zones. The method comprises conditioning air through an air-conditioning unit, providing conditioned air to at least one of the plurality of temperature zones, measuring temperatures inside the plurality of temperature zones through at least one of a plurality of temperature zone sensors, each of which is associated with a temperature zone, receiving information representing the closing state of at least one door of the cabin through at least one control unit, and selectively controlling the temperature of the conditioned air provided to the temperature zones in a first operation mode when the at least one door is closed and, in a second operation mode, when at least one of the at least one door is open, wherein, in the first operation mode, the temperature of the conditioned air provided to at least one of the plurality of temperature zones is controlled depending on the temperatures measured by at least one of the plurality of temperature zone sensors, and wherein, in the second operation mode, the temperature of the conditioned air provided to at least that temperature zone closest to an open one of the at least one door is controlled depending on at least one set-temperature and independent of a temperature measured by any of the temperature zone sensors.

The method may further comprise identifying that temperature zone closest to an open one of the at least one door by means of a cabin zone layout device in the at least one control unit, which is configured for storing information about a cabin zone layout including a position of the plurality of temperature zones in relation to at least one door.

Advantageously, the method may comprise creating tire set-temperature depending on at least one measured temperature in at least one of the plurality of temperature zone that is not closest to an open one of said at least one door.

The method further comprises receiving information about an ambient temperature, wherein creating the set-temperature comprises determining the set-temperature based on a difference between a desired temperature in that temperature zone closest to an open one of the at least one door and the ambient temperature. Creating the set-temperature may alternatively comprise setting the set-temperature as the temperature of a temperature zone adjacent to a temperature zone closest to an open one of the at least one door. Creating the set-temperature may also comprise setting the set-temperature to a predetermined fixed temperature.

Controlling the temperature of the conditioned air provided to at least one of the plurality of temperature zones comprises controlling the temperature of the conditioned air delivered by the air-conditioning unit in the second mode of operation to assume a predetermined temperature.

A further embodiment relates to an aircraft having a cabin with a plurality of temperature zones and at least one door, the aircraft comprising at least one air conditioning system described above and a source of pressurized air, such as a main engine and/or an auxiliary power unit that may preferably be used for operating the air conditioning system on ground.

BRIEF DESCRIPTION OF THE DRAWINGS

Other objects, features and advantages will hereinafter be described in conjunction with the following drawings, wherein like numerals denote like elements, and.

DETAILED DESCRIPTION

The following detailed description is merely exemplary in nature and is not intended to limit the embodiment or the application and uses of the embodiment. Furthermore, there is no intention to be bound by any theory presented in the preceding background of the embodiment or the following detailed description.

Figure 1:
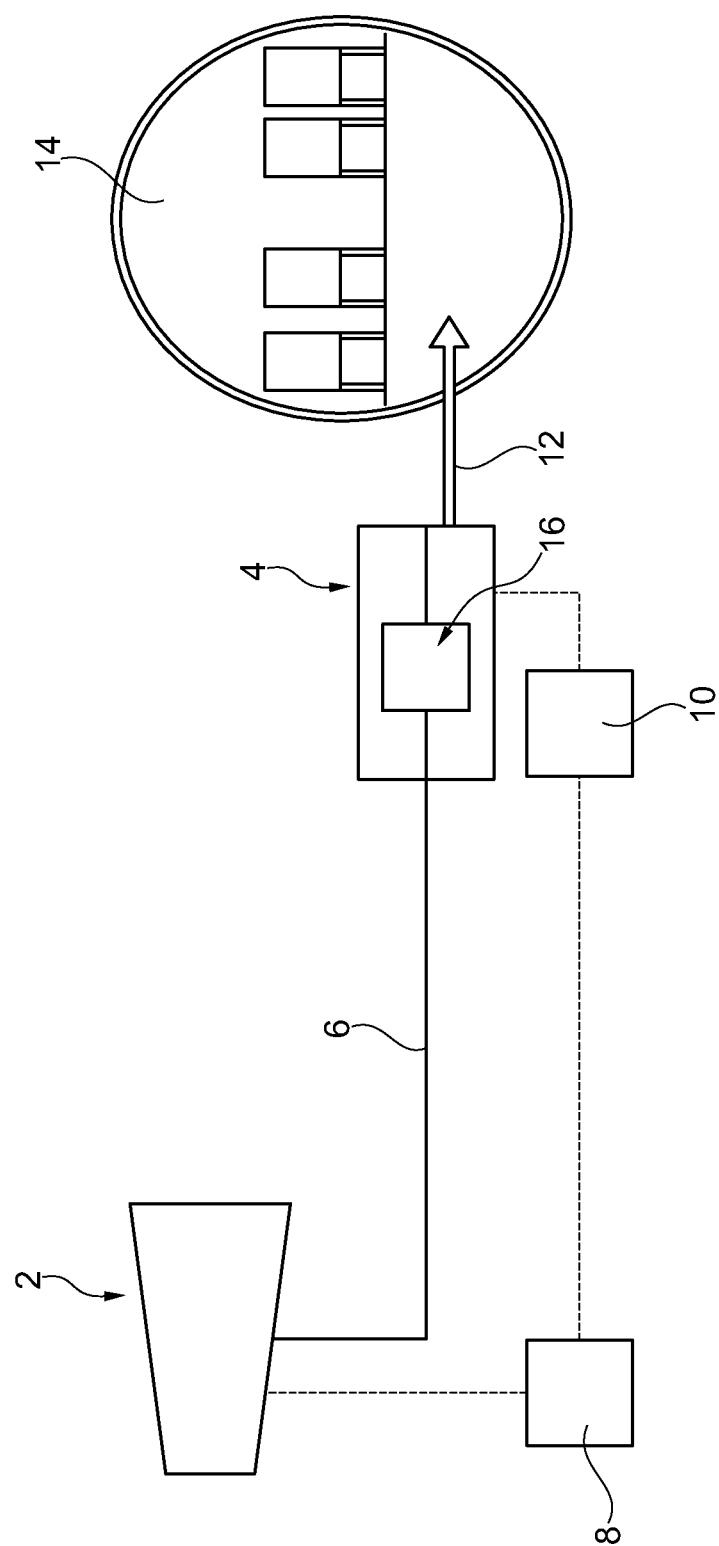
FIG. 1 is a block diagram of an APU and an air conditioning unit.

FIG. 1 shows an auxiliary power unit 2 and an air-conditioning unit (pack) 4 that provides conditioned process air. The auxiliary power unit (APU) 2 delivers compressed air at an elevated temperature that is routed to the air-conditioning unit 4 via a compressed air duct 6. The auxiliary power unit 2 is controlled by means of a dedicated APU controller 8 that is electrically coupled to the APU 2 as well as to a dedicated pack controller 10, which in turn is electrically coupled to the air-conditioning unit 4. Through the APU controller 8 and the pack controller 10, the operation of the APU 2 as well as the air conditioning unit 4 are adjusted.

The compressed air at the elevated temperature delivered by the APU 2 is expanded and cooled within the air-conditioning unit 4 by means of one or a plurality of internal modules 16 and routed by means of a supply air duct 12 to a supply unit (not shown) in a cabin 14.

Figure 2:
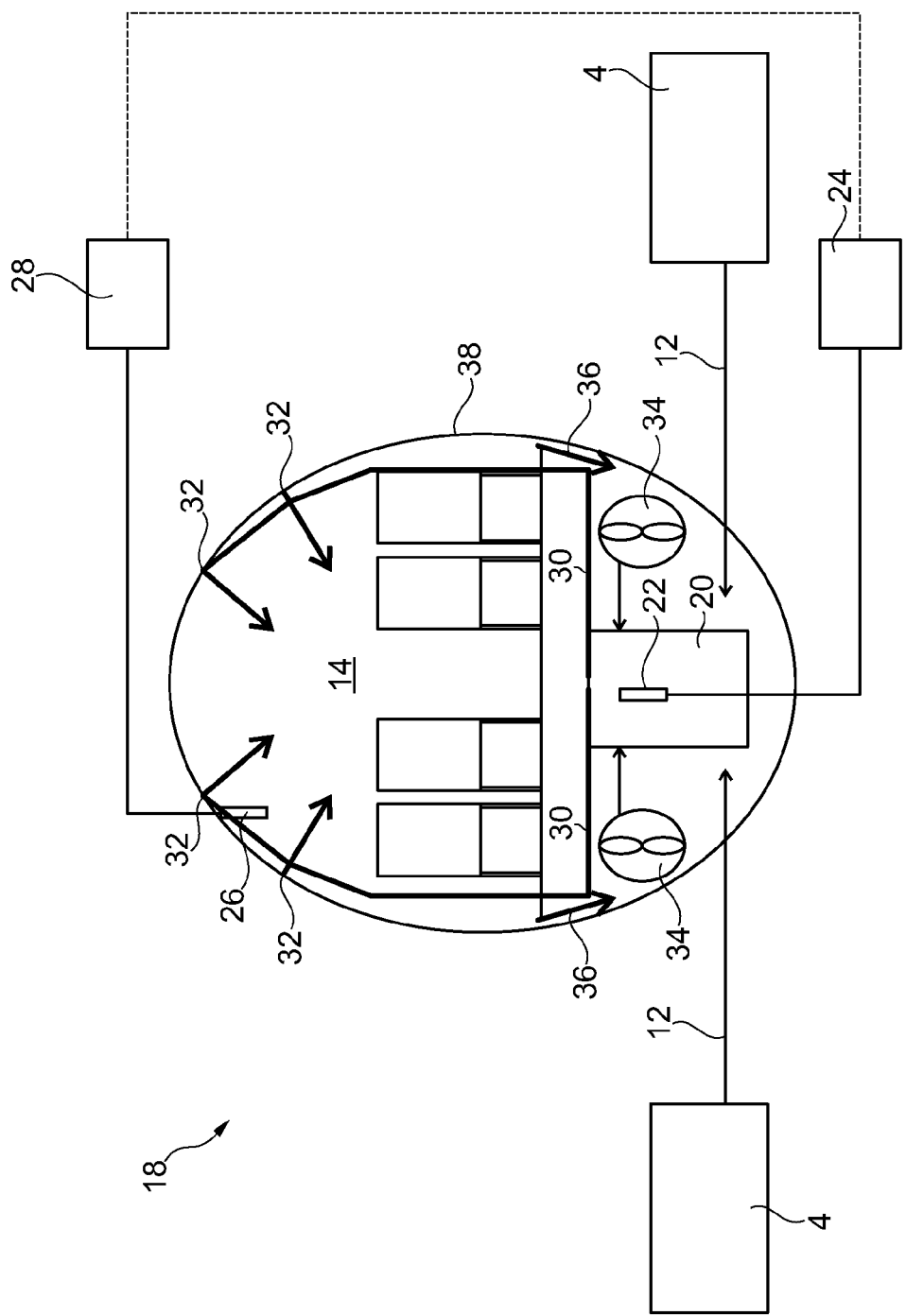
FIG. 2 is a block diagram of an air conditioning system in accordance with an embodiment.

FIG. 2 schematically shows the general setup of an air-conditioning system 18 according to an embodiment. Two air-conditioning units 4 provide conditioned process air via two supply air ducts 12 to a supply unit 20 that may be realized, for example, as a mixer unit. A supply unit temperature sensor 22 is located inside supply united and is coupled to an air-conditioning control unit 24. Hence, the temperature inside the supply unit 20 may constantly be measured, and the air-conditioning control unit 24 is able to control the air-conditioning system 18 inter alia based on this measured supply unit temperature.

Figure 3A:
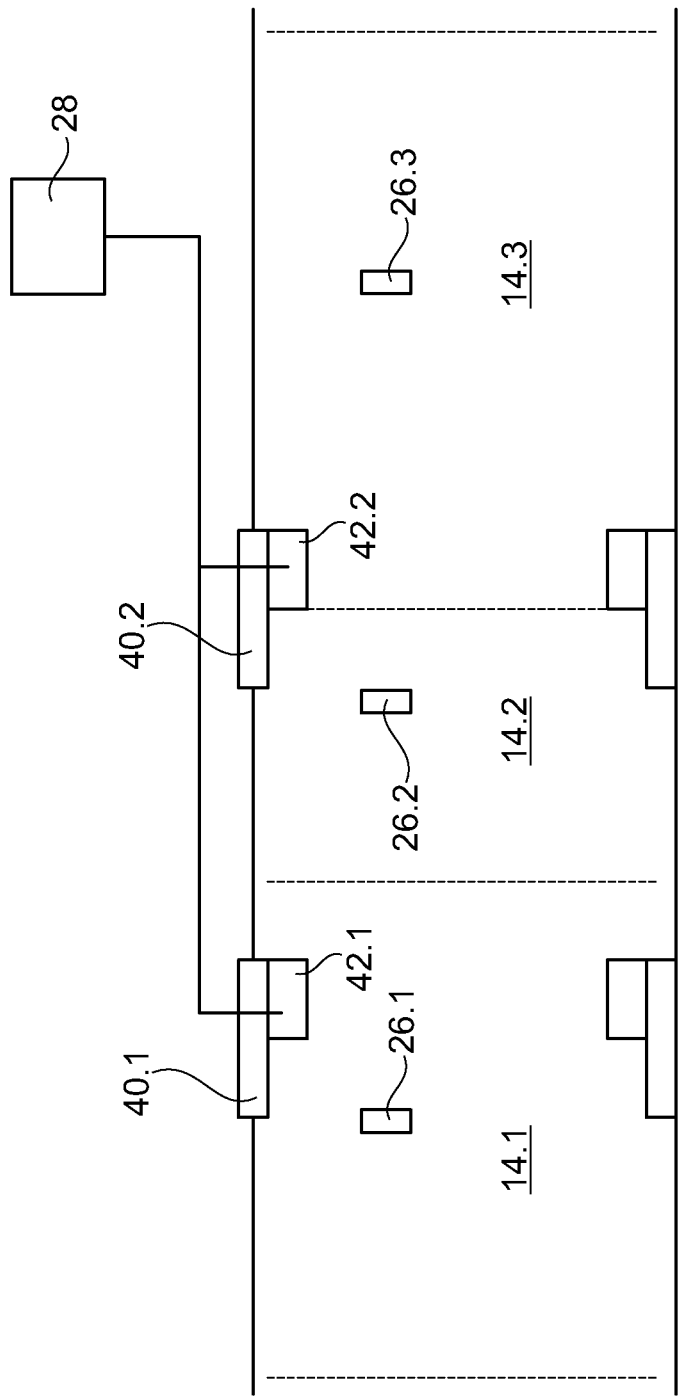
FIG. 3a illustrates a cabin having a plurality of temperature zones in accordance with an embodiment.

The cabin 14 comprises a plurality of different temperature zones 14.1, 14.2, 14.3 (see FIG. 3A), wherein each temperature zone 14.1, 14.2, 14.3 comprises a zone temperature sensor 26. While in FIG. 2, only one temperature zone is shown. FIG. 3 shows an overview over a plurality of temperature zones 14.1, 14.2, 14.3. The zone temperature sensor 26 of FIG. 2 is coupled to a zone temperature control unit 28.

Air from supply unit 20 flows to zone air ducts 30 and reaches the temperatures zones 14.1, 14.2, 14.3 of cabin 14 through a plurality of air outlets 32. After circulating through the cabin 14, it is sucked off by recirculation fans 34 which provide used air 36 to the supply unit 20. A fraction of the recirculated air is further disposed in a fuselage 38 of the aircraft.

It is clearly apparent from the FIG. 2 that by controlling the temperature of the air in the supply unit 20, a temperature control inside the cabin 14 may be accomplished. Further, the temperatures of the individual temperature zones 14.1, 14.2, 14.3 in the cabin 14, measured by the zone temperature sensors 26, may have an influence on individual reheaters or trim air valves not shown in the figures. However, of the temperature inside a cabin zone clearly exceeds a desired temperature range, the air conditioning unit 18 compensates this, e.g. through delivering a higher cooling or heating power. Hence, the zone temperature control unit 28 is coupled to the control unit 24.

It goes without saying that the control unit 24 and the zone temperature control unit 28 may be individual control units that are coupled to each other, may be individual control units that are completely independent from each other, or which may be realized in a single control unit 24 by adding a suitable algorithm or control logic. The control unit in the context of this embodiment may therefore comprise the control unit 24 or the zone temperature control unit 28 or another control unit not shown here.

Finally, FIG. 3 shows a cabin 14 having multiple temperature zones 14.1, 14.2 and 14.3. A plurality of second temperature sensors 26.1, 26.2 and 26.3 are present to acquire the individual zone temperatures. Further, two aircraft doors 40.1 and 40.2 are present, wherein the first aircraft door 40.1 is arranged in the first temperature zone 14.1 and the second cabin door 40.2 overlaps over two cabin zones 14.2 and 14.3.

The zone temperature control unit 28 (FIG. 2) is connected to indication units 42.1 and 42.2 that are configured to recognize the closing state of the first aircraft door 40.1 and the second aircraft door 40.2, respectively, and to send a corresponding signal to the zone temperature control unit 28. Hence, the zone temperature control unit 28 is able to provide a temperature control for the individual temperature zones 14.1, 14.2, and 14.3 depending on the closing state of the two aircraft doors 40.1 and 40.2, either by directly influencing the temperature inside the supply unit 20 (FIG. 2) or by triggering a control through the control unit 24 (FIG. 2) or any other control unit not shown.

When all doors 40.1 and 40.2 are closed, the air conditioning system 18 (FIG. 2) may be operated in a first operation mode in which the temperature in the temperature zones 14.1, 14.2, and 14.3 is controlled in a common way, i.e. by maintaining predetermined temperatures.

When the first aircraft door 40.1 is open, the air conditioning system 18 may be switched to a second operation mode. For example, the zone temperature control unit 28 receives a signal representing the open state of the first aircraft door 40.1. Ambient air from the surrounding of the aircraft reaches the first temperature zone 14.1, such that the temperature control in this zone is disturbed. If the cooling demand of the overall air-conditioning system 18 is increased due to a rather warm temperature surrounding the aircraft, excessive fuel consumption or excessive power need may result.

Hence, the measured zone temperature through the zone temperature sensor 26.1 in the affected first temperature zone 14.1 may be neglected, i.e. instead, a set-temperature may be used for the purpose of controlling the temperature of the air provided to the temperature zones 14.1, 14.2 and 14.3, such as the temperature measured at the zone temperature sensor 26.2 in the second temperature zone 14.2 or the temperature measured in the third cabin zone 14.3 that are not affected by the open door 40.1.

As an alternative, the zone temperature control unit 28 may also be configured for using a fixed set-temperature for the purpose of controlling the temperature of the air provided to the temperature zones 14.1, 14.2 and 14.3 instead of the measured temperature at zone temperature sensor 26.1 in the first cabin zone 14.1, exemplarily a desired target temperature, which has to be established inside the aircraft with closed doors.

Figure 3B:
FIGS. 3b and 3c show control units including a zone layout device.
Figure 3C:
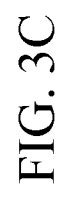

For enabling the zone temperature control unit 28, which may be integrated into the control unit 24, as explained above, to gain information about the position of temperature zones 14.1, 14.2, 14.3 in relation to the open aircraft door 40.1, the control unit 24 or 28 may comprise a cabin zone layout device 44, as shown in FIGS. 3b and 3c. The cabin zone layout device 44 is configured for storing information about a cabin zone layout, i.e. sizes and positions of the temperature zones 14.1, 14.2 and 14.3 in the cabin 14. This includes the position of the aircraft doors 40.1 and 40.2 in relation to the temperature zones 14.1, 14.2 and 14.3.

The zone layout device 44 is may be coupled to the control unit 24 or 28 and is configured for identifying an affected temperature zone 14.1, 14.2, 14.3 comprising an open door 40.1 or 40.2, in particular when it is queried by one of the control units 24 and 28. Through this information, the control unit 24 and 28, respectively, is able to suitably create a set-temperature, on which the control is based in the second operation mode, instead of using the measured temperature in the affected temperature zone 14.1, 14.2 or 14.3. Thus, the disturbance in the temperature control is neglected, and sufficient comfort may still be achieved.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. An air-conditioning system for conditioning a cabin of an aircraft, the cabin having a plurality of temperature zones and at least one door, the air conditioning system comprising:
    an air-conditioning unit, configured to condition air and provide the conditioned air to at least one of the plurality of temperature zones,
    a plurality of temperature zone sensors each of which is associated with a temperature zone for measuring the temperature in the respective temperature zone, and
    at least one control unit,
    wherein the at least one control unit is configured to receive information representing the closing state of the at least one door,
    wherein the at least one control unit is coupled to the plurality of temperature zone sensors and is configured to selectively control the temperature of the conditioned air provided to at least one of the plurality of temperature zones in a first operation mode, when at least one door is closed and, in a second operation mode, when at least one of at least one door is open,
    wherein, in the first operation mode, the temperature of the conditioned air provided to at least one of the plurality of temperature zones is controlled depending on the temperatures measured by at least one of the plurality of temperature zone sensors, and
    wherein, in the second operation mode, the temperature of the conditioned air provided to at least the temperature zone closest to an open one of the at least one door is controlled depending on at least one set-temperature.

2. The air-conditioning system of claim 1,
    wherein the control unit comprises a cabin zone layout device, that is configured to store information about a cabin zone layout including a position of the plurality of temperature zones in relation to the at least one aircraft door,
    wherein the zone layout device is coupled to the control unit and is configured to identify that temperature zone closest to an open one of the at least one door.

3. The air conditioning system of claim 1,
    wherein the control unit is configured to create the set-temperature depending on at least one measured temperature in at least one temperature zone, that is not closest to an open one of the at least one door.

4. The air conditioning system of claim 3,
    wherein the control unit is configured to receive information about ambient temperature, and
    wherein the control unit is configured to determine the set-temperature based on a difference between a desired temperature in that temperature zone closest to an open one of the at least one door and the ambient temperature.

5. The air conditioning system of claim 3,
    wherein the control unit is configured to set the set-temperature to one of the measured temperature of a temperature zone adjacent to that temperature zone closest to an open one of the at least one door and to a predetermined fixed temperature.

6. The air conditioning system of claim 1,
    wherein, in the second operation mode, the temperature of the conditioned air provided to at least that temperature zone closest to an open one of the at least one door is controlled independent of a temperature measured by any of the temperature zone sensors.

7. The air conditioning system of claim 1,
    wherein the control unit is configured to control the temperature of the conditioned air provided by the air-conditioning unit in the second mode of operation to assume a predetermined temperature.

8. A method for conditioning a cabin having a plurality of temperature zones and at least one door, the method comprising:
    conditioning air through an air-conditioning unit;
    providing conditioned air to at least one of the plurality of temperature zones;
    measuring at least one temperature inside the plurality of temperature zones through at least one of a plurality temperature zone sensors, each of which is associated with a temperature zone;
    receiving information representing the closing state of the at least one door of the cabin through at least one control unit; and
    selectively controlling the temperature of the conditioned air provided to at least one of the plurality of temperature zones in a first operation mode, when the at least one door is closed and, in a second operation mode, when at least one of the at least one door is open,
    wherein, in the first operation mode, the temperature of the conditioned air provided to at least one of the plurality of temperature zones is controlled depending on the temperatures measured by at least one of the plurality of temperature zone sensors, and
    wherein, in the second operation mode, the temperature of the conditioned air provided to at least that temperature zone closest to an open one of said at least one door is controlled depending on at least one set-temperature and independent of a temperature measured by any of the temperature zone sensors.

9. The method of claim 8, further comprising identifying that temperature zone, that is closest to an open one of the at least one door by means of a cabin zone layout device in the at least one control unit, that is configured to store information about a cabin zone layout including a position of the plurality of temperature zones in relation to the at least one door.

10. The method of claim 8, comprising creating the set-temperature depending on at least one measured temperature in at least one of the plurality of temperature zones, that is not closest to an open one of the at least one door.

11. The method of claim 10, further comprising receiving information about an ambient temperature through the at least one control unit, wherein creating the set-temperature comprises determining the set-temperature based on a difference between a desired temperature in that temperature zone closest to an open one of the at least one door and the ambient temperature.

12. The method of claim 10, wherein creating the set-temperature comprises setting the set-temperature as the temperature of a temperature zone adjacent to that temperature zone closest to an open one of the at least one door.

13. The method of claim 8, further comprising setting the set-temperature to a predetermined fixed temperature.

14. The method of claim 8, wherein controlling the temperature of the conditioned air provided to at least one of the plurality of temperature zones comprises controlling the temperature of the conditioned air delivered by the air-conditioning unit in the second mode of operation to assume a predetermined temperature.

\* \* \* \* \*